United States Patent [19]
Edler

[11] 3,738,893
[45] June 12, 1973

[54] APPARATUS FOR POSITIONING A TREAD BAND ON A VEHICLE TIRE

[76] Inventor: Bruno Edler, Roseggerstrasse 25, a-8600 Bruck a.d. Mur, Austria

[22] Filed: July 7, 1970

[21] Appl. No.: 52,861

[30] Foreign Application Priority Data
July 17, 1969 Austria.............................. A 6875

[52] U.S. Cl. ................. 156/394, 156/96, 156/128, 156/411, 156/416, 425/27, 425/44, 425/45, 425/387
[51] Int. Cl. ......................... B29h 5/04, B29h 17/36
[58] Field of Search............... 18/7, 2 V, 2 L, 2 TP, 18/4 V, 6 T, 6 R, 18 F; 156/394, 96, 396, 416, 411; 425/27, 44, 45, 387

[56] References Cited
UNITED STATES PATENTS
3,236,709  2/1966  Carver ................................ 156/96
1,455,260  5/1923  Midgley ........................ 156/394 X
3,332,820  7/1967  Porter ................................ 156/394
3,532,577  10/1970  Niclas et al. .................... 156/396 X
2,836,847  6/1958  Soderquist ........................ 18/2 TP
3,283,795  11/1966  Schelkmann .......................... 156/96

FOREIGN PATENTS OR APPLICATIONS
1,068,458  10/1966  Germany .............................. 18/6 T Primary Examiner—Alfred L. Leavitt
Assistant Examiner—C. B. Cosby
Attorney—Woodhams, Blanchard and Flynn

[57] ABSTRACT

An apparatus for positioning a closed thread band on a vehicle tire whereby the closed tread band is disposed around and spaced from a tire and there the space between the tread band and the tire is evacuated. The tread band is thereafter brought into contact with the tire and affixed thereto.

15 Claims, 12 Drawing Figures

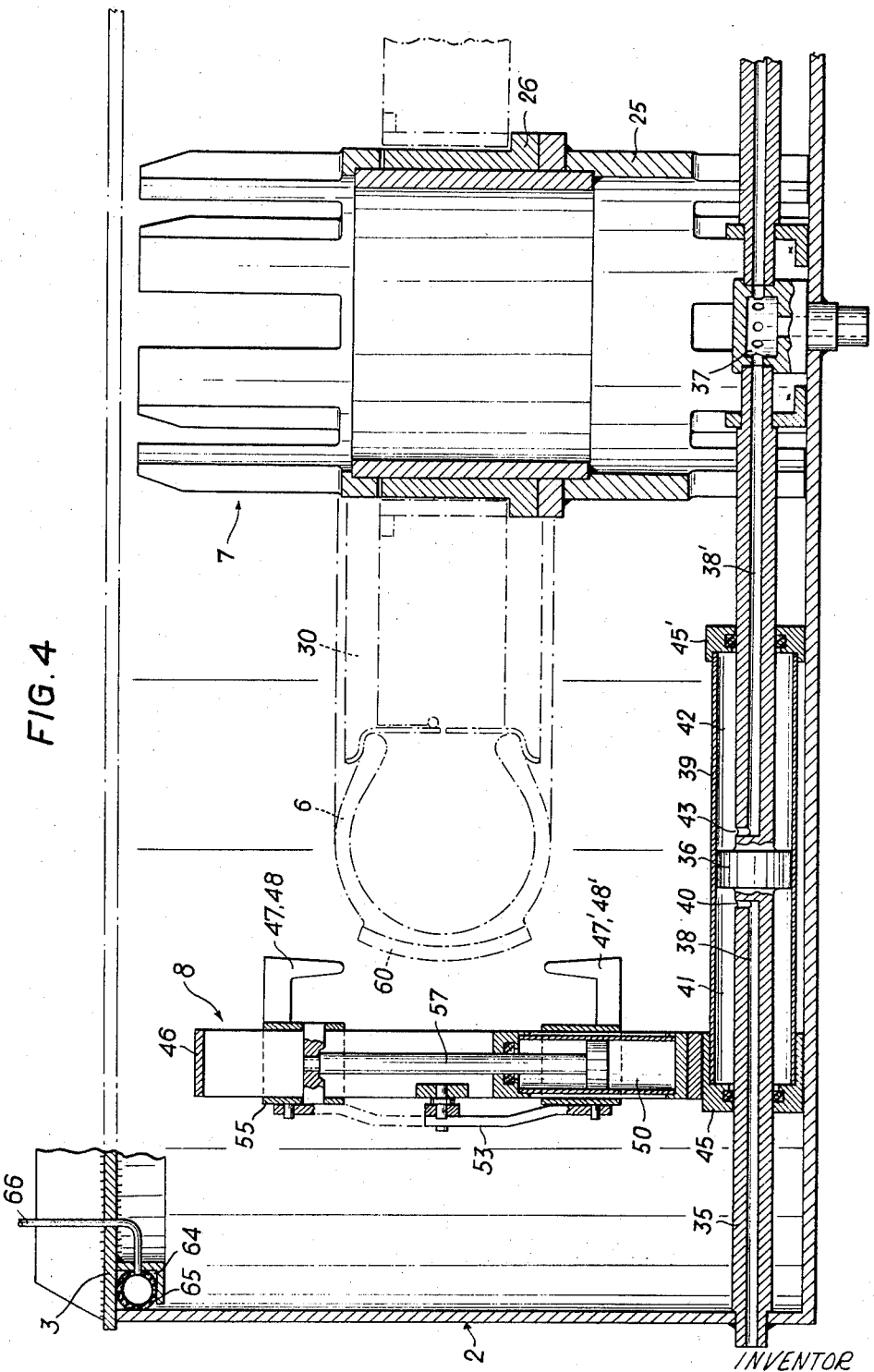

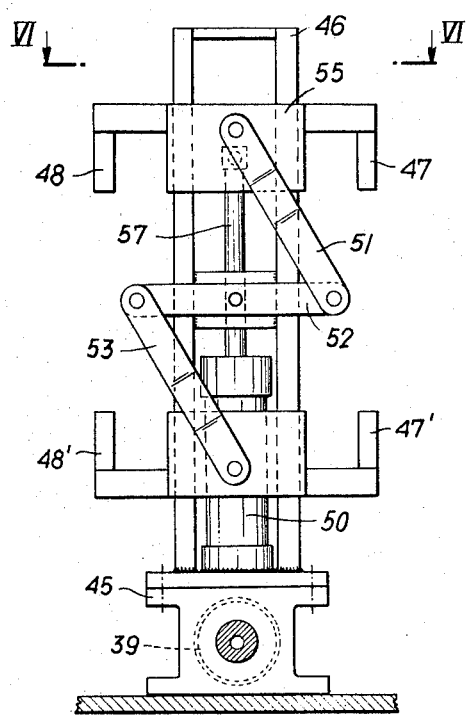
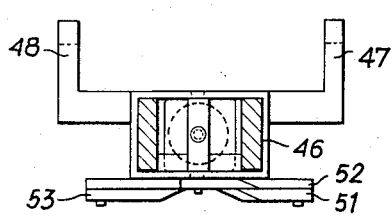
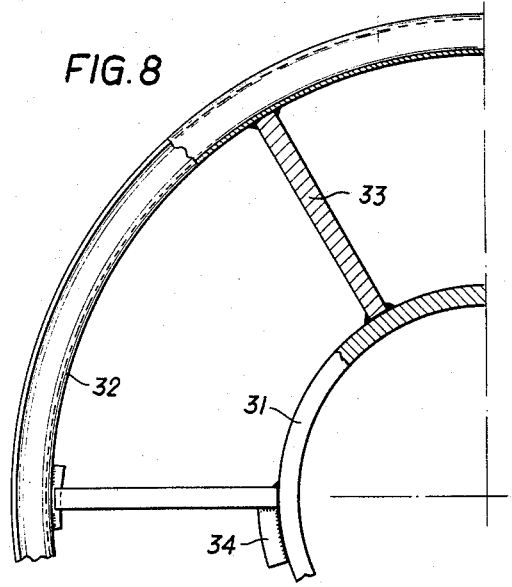
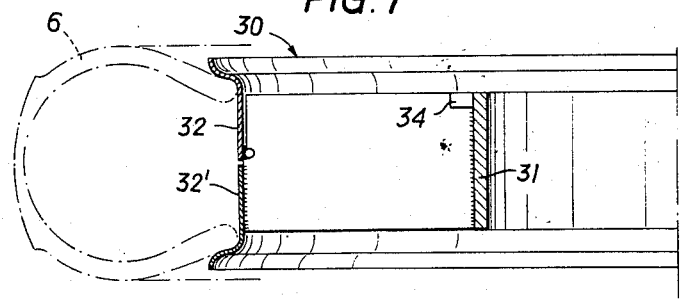

APPARATUS FOR POSITIONING A TREAD BAND ON A VEHICLE TIRE

The invention relates to an apparatus for positioning a closed tread band on the periphery of a vehicle tire.

It is known in connection with remoulding worn vehicle tires to apply a tread band to the tire and to bond it to the tire. For this purpose, the vehicle tire, in order to remove unevennesses, is first buffed and subsequently abraded in order to ensure good adhesion with the tread band. Thereafter, a tread band is coated with unvulcanized rubber and is applied manually to the vehicle tire. The tire and the tread band are than completely enveloped in a jacket and the jacket is evacuated. The result of this is that the external atmospheric pressure acts on the tread band to press it against the tire. Finally, in order to achieve a firm bond between the tread band and the tire, the tire, still enveloped in the jacket, is subjected to a heat treatment to vulcanize the rubber between tread band and tire.

This process displays a number of disadvantages. Firstly, this process may only be partially mechanised, because the tire, which is not mounted on a rim, does not maintain its shape. In addition, when the tires are large, e.g. lorry tires, auxiliary apparatus is required, such apparatus not being required for smaller tires.

Secondly, as the process does not require the tire to be inflated, the tire does not display the same size during remoulding as it does when it is used. Thus, inflation of the tire after remoulding may lead to the formation of cracks in the tread band.

A further disadvantage with this process is that it is not possible to avoid trapping air between the tread band and the tire during application of the tread band to the tire and that any air trapped cannot be reliably removed by merely evacuating the jacket enveloping the tire. Where air is trapped between the tread band and the tire, an incomplete bond is formed therebetween during vulcanization. A remoulded tire displaying such defects must, therefore, be regarded as a reject, because the tread band may easily, in use, become detached from the tire.

Finally, an additional disadvantage of this process is that applying the tread band to the tire manually cannot be performed accurately enough for the lateral edges of the tread band to be precisely aligned with the sidewalls of the tire.

In summary, it may therefore be concluded that this known process, on the one hand, requires manual labor and the associated expense of such labor and that, on the other hand, it does not ensure a completely satisfactory bond between the tire and the tread band.

Although the present invention is primarily directed to any novel integer or step, or combination of integers or steps, hereinbefore described and/or shown in the accompanying drawings, nevertheless according to one particular aspect of the present invention to which, however, the invention is in no way restricted, there is provided a an apparatus for positioning a closed thread band on the periphery of a vehicle tire comprising the steps of disposing the closed tread band around and spaced from a tire to be remoulded, evacuating the space between the tread band and the tire, bringing the tread band into contact with the tire and affixing the tread band to the tire.

Preferably the apparatus stretches the tread band to be spaced from the tire. The apparatus may also inflate the tire prior to bringing the tread band into contact with the tire.

Preferably, the affixing of the tread band to the tire is by vulcanization of an unvulcanised rubber layer provided between the tire and the tread band. The process may, in addition, include the step of abrading the tire prior to bringing the tread band into contact with the tire.

The tread band is, preferably, more difficult to stretch over its edge region than over its central region. Thus, continuous strips may be provided along the longitudinal edges of the tread band, the central region of the tread band being weakened by providing it with grooves or channels.

According to a further non-restrictive aspect of the present invention, there is provided an apparatus for positioning the tread band on a vehicle tire, comprising a vessel, gripping means within the vessel for disposing a closed tread band around and spaced apart from a tire to be retreaded, and for bringing the tread band into contact with the tire, evacuating means for evacuating the vessel and the space between the tread band and the tire, and means for affixing the tread band to the tire.

The gripping means may be radially displaceable relative to the tire axis.

The vessel may have a lid, and sealing means may be provided to hermetically seal the lid on the vessel. Hydraulic means may also be provided to move the lid relative to the vessel.

In the preferred embodiment the sealing means comprises a hose extending around and adjacent the junction between the vessel and the lid when the latter is in position on the vessel, and means to inflate the hose to hermetically seal the vessel. The lid of the vessel, therefore, may have a groove within which the hose is disposed.

The apparatus, preferably, includes crane means for moving the tread band into the vessel and for moving the tire into and out of the vessel. The crane means may be pivotally mounted relative to the vessel, and may be provided with gripping means for engaging the tread band and the tire and moving the same.

A mandrel may be provided in the vessel for carrying the tire. A sleeve, preferably, is rotatably mounted on the mandrel so that the rim and tire may be rotated relative to the mandrel.

The apparatus may also include a rim for carrying a tire to be retreaded, the rim comprising two parts retained together by a connecting means, the arrangement being such that the rim can be split in the plane of the tire.

In addition, the apparatus may include a roll which may be driven and which may be moved from a position where it is spaced apart from the tire to a position in which it engages the tire to rotate the same.

The gripping means may be hydraulically movable. In the preferred embodiment, the gripping means comprises a plurality of grippers, each gripper being carried by a respective cylinder of a piston and cylinder arrangement, each cylinder being displaceable relative to the piston by a pressure fluid supplied to the cylinder. Each piston may be carried by a rod, through which, in operation, pressure fluid is supplied to the respective cylinder. Preferably, the grippers include at least one pair of mutually facing, displaceable hooks. Thus, the hooks of the or each pair may be connected together by linkage means. The hooks of the or each pair are, preferably, displaceable by a pressure medium.

The invention is illustrated, merely by way of example, in the accompanying drawings, in which:

FIG. 4 shows a part of the apparatus of FIG. 1 on a larger scale,

FIG. 5 shows a side view of part of FIG. 4,

FIG. 6 is a section taken on line VI—VI of FIG. 5,

FIGS. 7 and 8 show, in plan and partially in section, parts of a rim for holding a vehicle tire.

Figure 1:
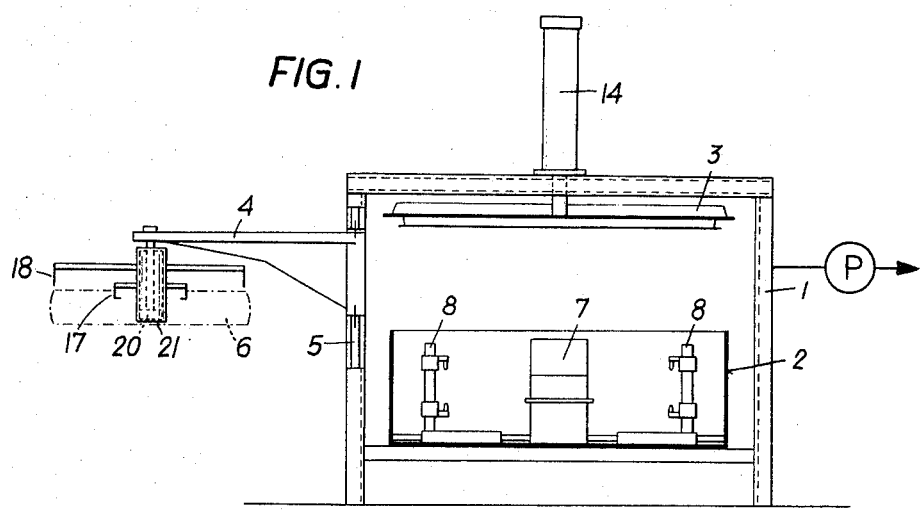
FIG. 1 is a side view, in section, of an apparatus according to the present invention.
Figure 2:
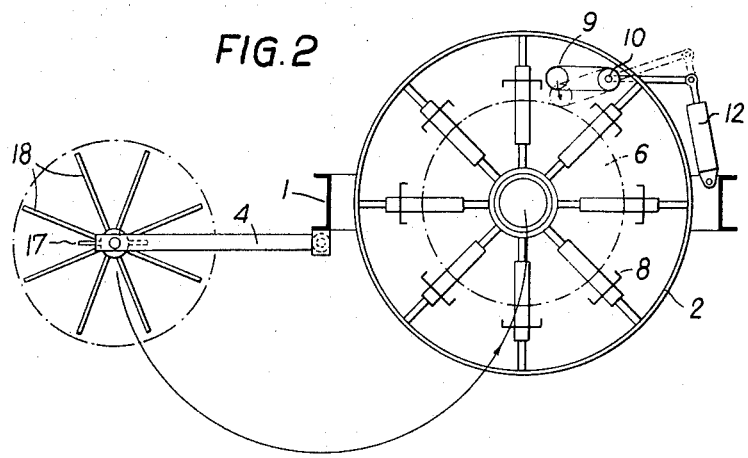
FIG. 2 is a plan view of the apparatus of FIG. 1, FIGS. 3a–3d are diagrammatic representations illustrating the application of a tread band on a vehicle tire.

An apparatus according to the present invention is shown in FIGS. 1 and 2. This apparatus consists of a framework 1 carrying a cylindrical vessel 2 that can be hermetically sealed by a lid 3. The frame is provided, on one side, with a pivotally movable crane arm 4 which is vertically displaceable along, and pivotally mounted about, an axis 5 and which can be pivoted to a position over the vessel 2.

In the vessel 2 there is a mandrel 7 for accommodating a rim (not shown) carrying a vehicle tire 6 to be retreaded. In FIG. 1, the tire 6 is shown being carried by the crane arm 4. In addition, a plurality of grippers 8, displaceable radially with respect to the mandrel 7, are arranged in the vessel 2. These grippers are described in greater detail with reference to FIGS. 4 to 6. The vessel 2 also has a roll 9 (FIG. 2) disposed therein, and this roll can be driven and pivoted into contact with the vehicle tire 6 when carried by the mandrel 7. A cylinder 12, provided outside the vessel 2, pivots the roll 9 about an axis 10.

The lid 3 of the vessel 2 is vertically displaceable by a cylinder 14 carried by the framework 1. When the lid 3 is in the position shown in FIG. 1 the crane arm 4 can be pivoted and a vehicle tire to be retreaded, and a tread band can be introduced into the vessel. When the lid 3 is lowered on to the vessel 2, the latter is hermetically sealed and a reduced pressure or vacuum is generated in the vessel.

The crane arm 4 is provided at its outer end with a carrier 17 for a vehicle tire 6 and with grippers 18 for a tread band. The carrier 17 and the grippers 18 are carried by a cylinder 21 whose piston 20 is connected to the crane arm, thereby allowing the carrier 17 and grippers 18 to be vertically adjustable. Pressure medium is fed to the cylinder 21 via flexible lines (not shown).

FIG. 4 shows, in greater detail, the construction of the mandrel 7, the grippers 8 and means for hermetically sealing the vessel 2. The mandrel 7 comprises a sleeve 25 centrally mounted in the vessel 2 carrying a bearing sleeve 26 that can be rotated with respect to the sleeve 25. The bearing sleeve 26 accommodates a rim 30 carrying the tire 6.

In order to ensure that the vessel 2 is hermetically sealed, the edge of the lid 3 has an L-section 64 forming a groove. A hose 65 is inserted in the groove, and the hose can be inflated and deflated via a line 66. As soon as hose 65 is inflated it lies sealingly against both the wall of the vessel 2 and the lid 3.

A plurality (eight shown in FIG. 2) of piston rods 35, arranged in the shape of a star, are provided adjacent to the base of vessel 2, and each of these piston rods has a piston 36 approximately at its center between the wall of the vessel 2 and the mandrel 7. Each rod has a bore 38 extending from the wall of the vessel 2 to the piston 36 and a bore 38' extending from the piston to a distributor 37. Each piston rod 35 and piston 36 is surrounded by a cylinder 39 whose head portions 45, 45' can slide over the base of the vessel 2.

When a pressure medium is introduced through the bore 38 of the piston rod 35, it enters a left-hand cylinder space 41 through a radial bore 40 and effects a radially outward displacement of the cylinders 39 and the grippers 8 carried thereby towards the wall of the vessel 2. The pressure medium in an inner cylinder space 42 reaches the distributor 37 through a radial bore 43 and the bore 38'. By contrast, when pressure medium is supplied from distributor 37 it effects a radially inward displacement of the cylinders 39 and grippers 8 towards the distributor 37.

As is shown in FIGS. 4 to 6, each gripper 8 comprises a carrier 46 connected to the head portion 45 of the respective cylinder 39. This carrier 46 carries two pairs of hooks 47, 47' and 48, 48' to grip the tread band. The hooks are connected with one another by means of a plurality of linkage rods 51, 52, 53 and can be moved vertically by means of a cylinder 50 whose piston rod 57 engages on a carrier 55 carrying the hooks 47, 48.

FIGS. 7 and 8 show a rim 30 for use with the previously described apparatus. In order to be able to fit the tire 6 on the rim 30 simply, the rim is capable of being split into two parts in a plane perpendicular to the axis of the tire, i.e. in the plane of the tire. The two rim parts are connected with each other in a manner similar to that of a bayonet closure. The rim consists of an inner sleeve 31 which is adapted to lie on the bearing sleeve 26 and outer rim portions 32, 32' carrying the tire. The inner sleeve 31 and the rim portion 32' are connected with one another by radial webs 33 arranged in the form of a star. In order to enable the carrier 17 on the crane arm 4 to engage and retain the rim 30 and the tire 6, the inner sleeve 31 is provided with horizontally projecting extensions 34 beneath which the carrier 17, having likewise horizontally projecting portions (not shown), is arranged so as to engage and retain the rim 30 and the tire 6 on the crane arm 4.

Figure 9:
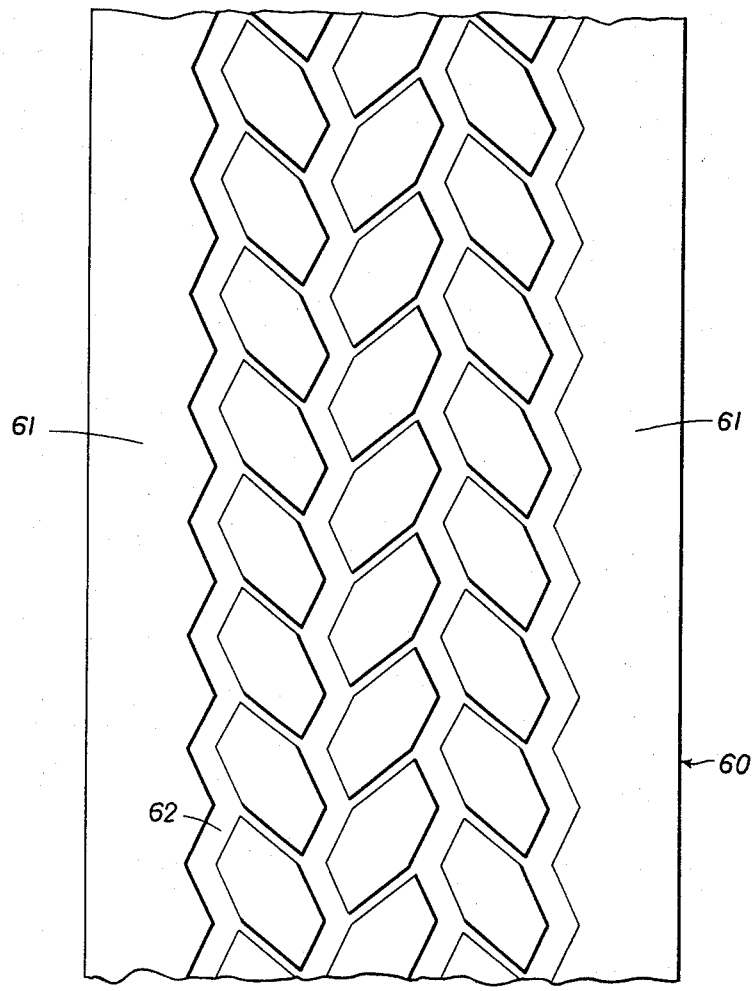
FIG. 9 is the plan view of a tread band for use with the present invention.

FIG. 9 shows a tread band that is suitable for retreading a tire. A rubber tread strip when pressed into a band forms a band of cylindrical shape. However, the surface of the tread zone of a tire is cambered, and thus the tread band should likewise be able to assume a cambered shape in order to avoid interfering stresses arising in it during its application to the tire and during vulcanization. A tread band 60 is shown in FIG. 9 and this is provided along its longitudinal edges with continuous strips 61, while over its central region it is weakened by grooves or channels 62. This construction ensures that the tread band can stretch over its central region to a greater extent than over its edge region and as a result assumes the desired cambered shape of the tire as soon as it is applied thereto.

Retreading of a vehicle tire using the apparatus hereinabove described takes place in the following manner. A vehicle tire 6 to be retreaded is buffed to eliminate unevenness and is then abraded. Next, a tread band 60 is cut into the length required for the tire and formed into a ring. The tread band is provided with a coating of non-vulcanized rubber. The tire is fitted to the rim 30 by placing it between the outer rim portions 32, 32', and joining these outer rim portions together by the bayonet closure. The tire is then inflated, to its normal pressure, and preferably to an excess pressure.

Figure 3A:
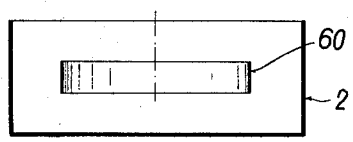
Figure 3C:
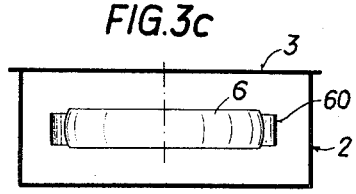
Figure 3B:
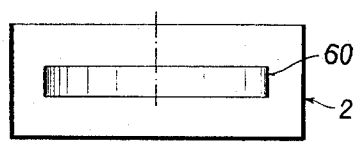

Initially, the tread band 60 is engaged and retained by the grippers 18 of the crane arm 4, the latter being pivoted so that the tread band is introduced into vessel 2. Once in the vessel the tread band is engaged and retained by the grippers 8 (as shown schematically in FIG. 32). As soon as the pairs of hooks 47, 47'48, 48' have engaged the tread band 60, pressure fluid is fed to the bore 38 of each piston rod 35, causing the grippers 8 to move radially outwardly. As a result tread band 60, as shown schematically in FIG. 3b, is stretched to a larger diameter. The tire to be retreaded is then introduced into the vessel 2 by means of the crane arm 4 whose carrier 17 engages beneath the extensions 34 in the rim 30. The rim is then laid on the bearing sleeve 26. Subsequently, the lid 3 is lowered on to vessel 2 by the cylinder 14, and by inflating the hose 65 the vessel 2 is hermetically sealed. FIG. 3c shows schematically the positions of the tire 6 and the tread band at this stage.

Figure 3D:
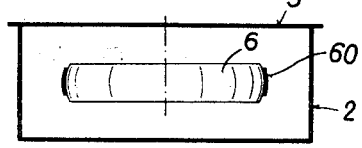

The next step is to reduce the pressure in the vessel 2 and this is accomplished by pump means P (FIG. 1). Pressure fluid is fed to the distributor 37, and channels 38' to cause the grippers 8 to be displaced radially inwardly and the tread band engages the tire 6. Finally, by actuating the cylinder 50 the pairs of hooks 47, 47'48, 48' are moved apart vertically so that they no longer engage the tread band. As a result the tread band 60 is engaged on the tire, as is shown schematically in FIG. 3d.

The grippers 8 are then moved radially outwardly and the cylinder 12 is actuated so that the roll 9 engages the tread band 60 and causes the tire to rotate together with the rim 30 and the bearing sleeve 26. The pressure exerted on tread band 60 by the roll 9 causes the tread band to be pressed evenly on to tire 6.

As soon as this has taken place, the hose 65 is deflated and air is admitted into vessel 2, and the lid 3 is raised. The tire 6, with the tread band 60 now applied on it, is taken out of vessel 2 by means of the crane arm 4. The tire and rim 30 are then introduced into an autoclave (not shown) to vulcanise the rubber layer provided between tread band 60 and tire 6. The tire pressure is controlled from outside the autoclave during vulcanization.

It will be apparent that this process avoids the disadvantages of the previously known process. On the one hand, the process according to the present invention achieves substantial mechanisation resulting in an elimination of expensive manual labor. On the other hand, the fact that the tread band is applied on the tire inside an evacuated vessel absolutely eliminates trapping of air between the tread band and the tire. Finally, the tread band is accurately applied to the tire because the tire is held in the desired position with respect to the tread band.

The embodiments of the invention in which an exclusive property or privilege is claimed are defined as follows:

1. An apparatus for use in retreading a worn vehicle tire, comprising:

means defining a container having an opening therein and adapted to receive a worn vehicle tire mounted on a rim;

mandrel means for holding said rim having said worn tire thereon in said container means and permitting rotation of said tire;

means defining an annular, closed tread band;

movable gripping means for supporting said closed tread band means in a radially, spaced relationship from the periphery of said worn tire;

transport means adapted to hold said rim having a worn tire thereon for transporting said rim and worn tire from a position outside said container means to a position inside said container means and depositing same therein on said mandrel means;

means for hermetically sealing said container means after said rim, said worn tire and said closed tread band have been placed therein;

evacuating means for evacuating said container means and the space between said closed tread band means and said periphery of said worn tire;

drive means for moving said gripping means toward said periphery of said worn tire after said container has been evacuated and to deposit said closed tread band means on said periphery of said worn tire to thereby prevent the entrapment of air between said tread band means and said periphery of said worn tire; and a driven roller adapted to press the periphery of said tread band means while rotating the tire in said container under vacuum.

2. Apparatus according to claim 1, wherein said means for hermetically sealing said container comprises a lid adapted to fit over the opening in said container and seal means for sealing said lid to said container.

3. Apparatus according to claim 2, wherein said lid includes means for moving said lid vertically in relation to said container between open and closed positions.

4. Apparatus according to claim 2, wherein said hermetically sealing means comprises an inflatable hose adapted, when inflated, to simultaneously sealingly engage said container adjacent said opening and said lid.

5. Apparatus according to claim 1, wherein said mandrel means includes rotatably mounted sleeve means, said sleeve means being adapted to support said rim for rotation.

6. Apparatus according to claim 1, wherein said rim is split into halves along a central radial plane.

7. Apparatus according to claim 1, wherein said driven roller is rotatably mounted on a pivotable lever arm in said container means, said lever arm being pivotable to cause an engagement of said roller with the periphery of said closed tread band means when said closed tread band has been deposited on said periphery of said worn tire.

8. Apparatus according to claim 1, wherein said drive means is adapted to drive said gripping means radially relative to said mandrel means.

9. Apparatus according to claim 8, wherein said drive means comprises at least one hydraulic cylinder movable radially of said mandrel means relative to a fixed piston element.

10. Apparatus according to claim 9, wherein said piston element is mounted on a hollow rod having openings therein which open outwardly adjacent said piston element on opposite sides thereof; and wherein said cylinder is slidable relative to said piston element by pressurizing one or the other ends of said hollow rod.

11. Apparatus according to claim 8, wherein said gripping means comprises a pair of hooks mounted for movement toward and away from each other generally transversely of said radial movement of said movable gripping means.

12. Apparatus according to claim 11, including means for moving said pair of hooks toward and away from each other.

13. Apparatus according to claim 12, wherein said moving means comprises a power cylinder having an extensible rod, one of said pair of hooks being mounted on said extensible rod for movement toward and away from the other of said hooks.

14. Apparatus according to claim 13, wherein said other of said pair of hooks is secured to said one hook by a linkage so that a movement of said one hook in one direction by said power cylinder will effect a movement of said other hook in the opposite direction.

15. An apparatus for use in retreading a worn vehicle tire, comprising:

means defining a container having an opening therein and adapted to receive a worn vehicle tire mounted on a rim;

mandrel means for holding said rim having said worn tire thereon in said container means;

means defining an annular, closed tread band;

movable gripping means for supporting said closed tread band means in a radially spaced relationship from the periphery of said worn tire;

transport means adapted to hold said rim having a worn tire thereon for transporting said rim and worn tire from a position outside said container means to a position inside said container means and depositing same therein on said mandrel means;

means for hermetically sealing said container means having said rim, said worn tire and said closed tread band therein;

evacuating means for evacuating said container means and the space between said closed tread band means and said periphery of said worn tire; and drive means for moving said gripping means toward said periphery of said worn tire in said evacuated container and to deposit said closed tread band means on said periphery of said worn tire to thereby prevent the entrapment of air between said tread band means and said periphery of said worn tire.

* * * * *